US009421837B2

(12) United States Patent
Lake et al.

(10) Patent No.: US 9,421,837 B2
(45) Date of Patent: Aug. 23, 2016

(54) VEHICLE SUSPENSION

(71) Applicant: Club Car, LLC, Evans, GA (US)

(72) Inventors: Ryan Douglas Lake, Appling, GA (US); Byron Jon Danielson, Martinez (UA)

(73) Assignee: Ingersoll-Rand Company, Davidson, NC (US)

( * ) Notice: Subject to any disclaimer, the term of this patent is extended or adjusted under 35 U.S.C. 154(b) by 0 days.

(21) Appl. No.: 14/515,187

(22) Filed: Oct. 15, 2014

(65) Prior Publication Data

US 2015/0102575 A1 Apr. 16, 2015

Related U.S. Application Data

(60) Provisional application No. 61/891,281, filed on Oct. 15, 2013.

(51) Int. Cl.
| | |
|---|---|
| *B60G 7/00* | (2006.01) |
| *B60G 11/08* | (2006.01) |
| *B60G 11/10* | (2006.01) |
| *B60G 15/06* | (2006.01) |

(52) U.S. Cl.
CPC ............. *B60G 7/001* (2013.01); *B60G 11/08* (2013.01); *B60G 11/10* (2013.01); *B60G 15/06* (2013.01); *B60G 2202/114* (2013.01); *B60G 2204/121* (2013.01); *B60G 2204/129* (2013.01); *B60G 2206/428* (2013.01); *B60G 2206/7101* (2013.01); *B60G 2300/13* (2013.01); *B60G 2300/26* (2013.01); *Y10T 29/49622* (2015.01)

(58) Field of Classification Search
CPC ...... B60G 7/001; B60G 15/06; B60G 11/10; B60G 11/08; B60G 2300/13; B60G 2204/121; B60G 2206/7101; B60G 2300/26; B60G 2204/129; B60G 2202/14; B60G 2206/428
See application file for complete search history.

(56) References Cited

U.S. PATENT DOCUMENTS

| | | | |
|---|---|---|---|
| 2,115,915 A | 5/1938 | McCain | |
| 2,131,476 A | 9/1938 | Jencick | |
| 2,149,895 A | 3/1939 | Maruhn | |
| 2,458,548 A * | 1/1949 | Aronson | ................ B60G 11/08 267/42 |
| 2,697,613 A * | 12/1954 | Giacosa | ................... 280/124.14 |
| 3,002,742 A * | 10/1961 | Troy | ............................... 267/38 |

(Continued)

FOREIGN PATENT DOCUMENTS

WO 2012/049857 A1 4/2012

OTHER PUBLICATIONS

International Searching Authority, International Search Report and Written Opinion issued in corresponding Application No. PCT/US2014/060723, mailed Mar. 11, 2015, 9 pp.

*Primary Examiner* — Darlene P Condra
(74) *Attorney, Agent, or Firm* — Taft Stettinius & Hollister LLP

(57) ABSTRACT

A golf cart vehicle is disclosed having a suspension that includes a single suspension device that provides for a plurality of functions. In one embodiment the single suspension device includes a plurality of transverse mounted leaf springs that are longitudinally spaced apart from one another to provide a spring and control arm combined effect. The leaf springs can be coupled to a wheel, such as through a steering knuckle via a ball and socket joint. The leaf springs can further be mounted to a chassis via clamps. In one embodiment the clamps are connected to the leaf springs through resilient bushings which can be spaced apart from one another to provide an anti-roll bar effect.

19 Claims, 3 Drawing Sheets

(56) References Cited

U.S. PATENT DOCUMENTS

| | | | |
|---|---|---|---|
| 3,292,918 A | 12/1966 | Hart | |
| 3,379,269 A | 4/1968 | Zetye | |
| 4,143,888 A | 3/1979 | Heinig | |
| 4,373,743 A | 2/1983 | Parsons, Jr. | |
| 4,509,774 A * | 4/1985 | Booher | 280/124.134 |
| 4,515,390 A | 5/1985 | Greenberg | |
| 4,738,466 A | 4/1988 | Mikina | |
| 4,772,044 A | 9/1988 | Booher | |
| 6,105,984 A | 8/2000 | Schmitz et al. | |
| 6,390,486 B1 * | 5/2002 | Boes et al. | 280/124.171 |
| 6,530,587 B2 | 3/2003 | Lawson et al. | |
| 6,659,482 B2 | 12/2003 | Carlstedt et al. | |
| 6,805,370 B2 * | 10/2004 | Raleigh et al. | 280/124.175 |
| 6,811,169 B2 | 11/2004 | Schroeder et al. | |
| 7,722,065 B2 * | 5/2010 | Platner et al. | 280/124.175 |
| 2002/0153648 A1 | 10/2002 | Lawson | |
| 2005/0023792 A1 | 2/2005 | Miller et al. | |
| 2008/0290623 A1 * | 11/2008 | Lundmark | 280/124.152 |
| 2009/0242285 A1 * | 10/2009 | Whetstone, Jr. | 180/19.2 |
| 2012/0292872 A1 * | 11/2012 | Koide et al. | 280/124.108 |
| 2012/0313339 A1 * | 12/2012 | Heimann et al. | 280/124.116 |
| 2013/0241167 A1 * | 9/2013 | Perri et al. | 280/124.134 |

* cited by examiner

VEHICLE SUSPENSION

TECHNICAL FIELD

The present invention generally relates to vehicle suspensions such as golf cart suspensions, and more particularly, but not exclusively, to single suspension devices that provide for multiple effects.

BACKGROUND

Providing vehicle suspensions that provide enhanced features remains an area of interest. Some existing systems have various shortcomings relative to certain applications. Accordingly, there remains a need for further contributions in this area of technology.

SUMMARY

One embodiment of the present, invention is a unique suspension for a vehicle such as a golf cart. Other embodiments include apparatuses, systems, devices, hardware, methods, and combinations for providing desired suspension systems. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
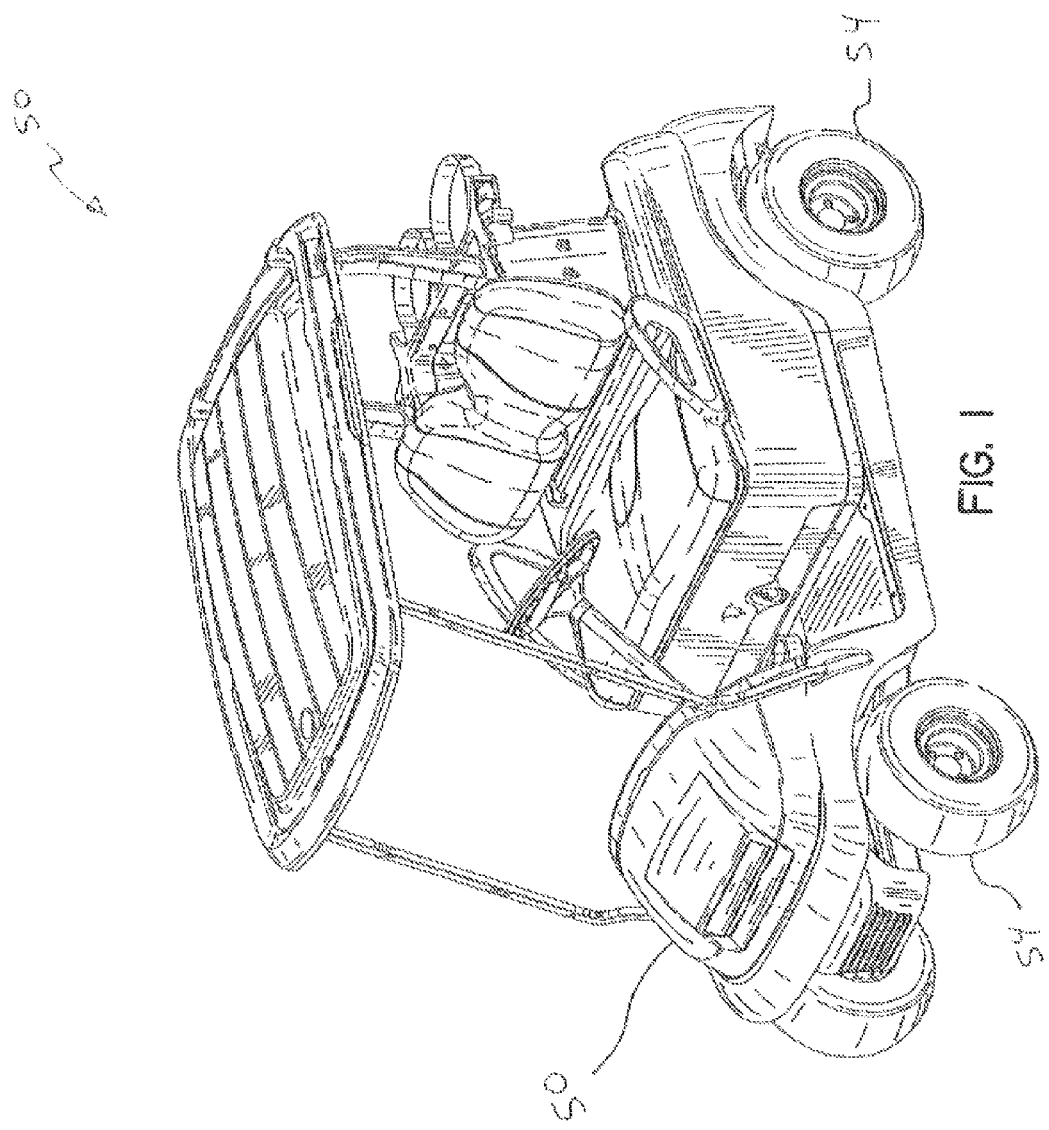
FIG. 1 depicts an embodiment of a vehicle in the form of a golf cart.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of vehicle 50 in the form of a motorized golf cart 50 is shown in which the vehicle includes a frame or chassis upon which a body 52 is secured, as well as a number of wheels 54 which are connected to the frame or chassis through a suspension (discussed further below). The golf cart can be motorized through a variety of mechanisms such as batteries, internal combustion engines, combinations thereof, etc. Although a motorized golf cart is depicted in FIG. 1, in alternative embodiments the vehicle 50 can be a utility vehicle, a neighborhood vehicle, or a similar passenger vehicle. Accordingly, it will be understood that descriptions found herein that mention "golf cart" are not to be construed as limited but rather can be applied more broadly as set forth above.

Figure 2:
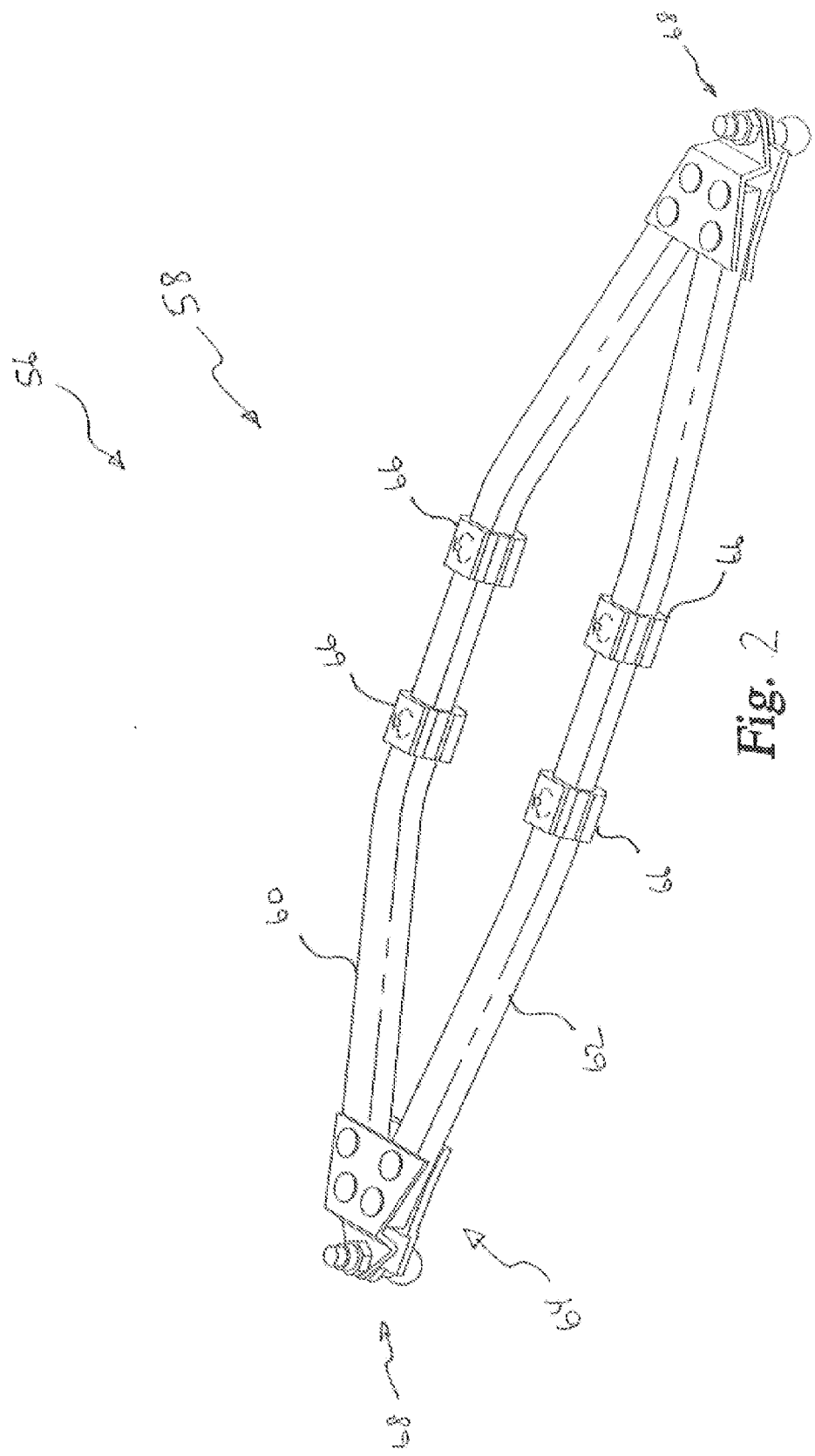
FIG. 2 depicts an embodiment of a combined spring and control arm device.
Figure 3:
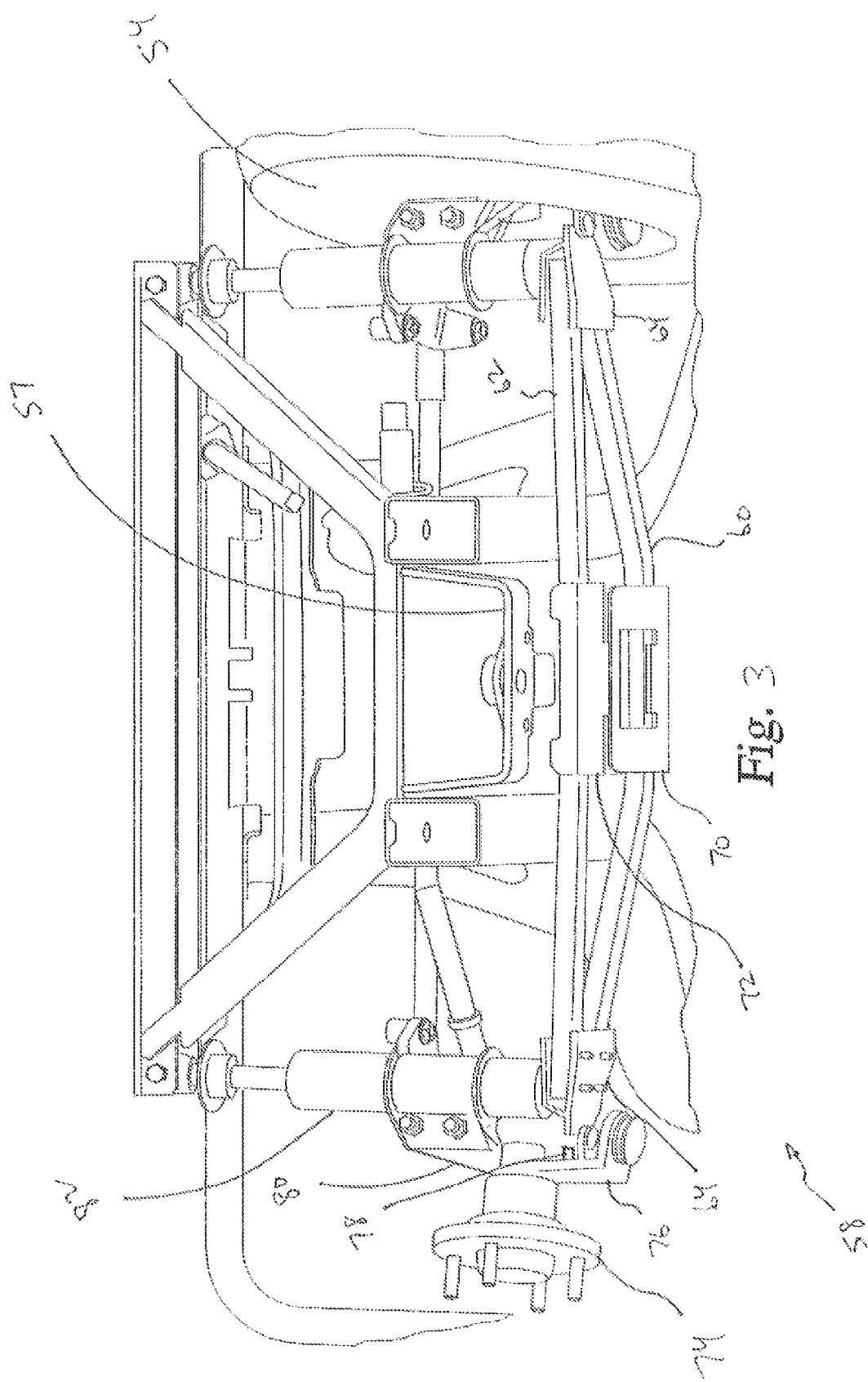
FIG. 3 depicts an embodiment of a combined spring and control arm device installed in a vehicle.

FIGS. 2 and 3 depict an embodiment of a suspension 56 used in the vehicle 50 to connect the wheels 54 to a chassis 57 and to provide ride quality and position control of the wheels 54, among other possible features. As used herein, the term "chassis" refers to any suitable rigid structure, whether or not load bearing, that is used as a carrier upon which the vehicle 50 is built. The chassis 57 can include any number of assemblies, frames, sub-frames, etc as will be understood.

In one non-limiting form the suspension 56 is located on the front of the golf cart and in the illustrated embodiment seen in FIG. 2 includes a combined spring and control arm 58 having spaced apart spring arms 60 and 62 as well as spring end brackets 64. The suspension 58 can also include bushings 66 which are used to couple the suspension 56 to the chassis 57.

As illustrated in FIG. 3 the suspension 58 does not include a traditional control arm. Rather, the combined spring and control arm 58 provide the control arm function. The combined spring and control arm serves multiple purposes of providing ride quality to occupants through a traditional spring function, and to control the location of the wheels through a traditional control arm function as will be described more fully below. The combined spring and control arm 58 includes spring arms 60 and 62 that are configured as transverse leaf springs that extend between laterally spaced wheels 54 of the vehicle 50.

The spring arms 60 and 62 are spaced apart from one another to reduce compliance in the longitudinal direction (direction of vehicle travel) and mimic and/or replicate the control arm function. The spacing of the spring arms 60 and 62 in the illustrated embodiment is shown at a minimal or no spacing at the spring end brackets 64, but relatively wide spacing at a location intermediate the brackets. The spacing can be symmetrical about a line that extends between brackets 64, but in other embodiments the spacing can take on any variety of shapes.

In one non-limiting description the spacing configuration of the spring arms 60 and 62 can be described as laterally spaced A-frame members that extend across the vehicle to join in the middle. The head of each A-frame member is coupled to move with the respective wheel (such as for example through a wheel hub carrier), white the legs of each A-frame member extend toward each other and meet in the middle of the vehicle. Not all configurations need have resemblance to A-frame members.

In another non-exclusive and/or non-limiting description the spring arms 60 and 62 can be described as being bowed away from each other. For example, the spring arms 60 and 62 generally extend away from each other to create an offset between the springs at areas between the spring end brackets 84. The offset can be an offset that varies according to the lateral distance between the spring end brackets, among other variations. In the illustrated form of FIG. 2 the offset is constant, over a limited span between the bushings 66.

The individual spring arms 60 and 62 can have a variety of shapes and sizes suitable to provide the capabilities set forth herein. In some embodiments the spring arms 60 and 62 can generally be planar in shape along the vehicle transverse axis, either when the arms 60 and 62 are fabricated and unloaded or installed in a loaded configuration on a golf cart 50. In other forms the spring arms 60 and 62 can be convex or concave. The cross section and cross sectional area of each spring arm 60 and 62 can, but need not, be similar between the spring arms 60 and 62. In some embodiments the cross sectional shape of the spring arms 60 and 62 is rectangular or otherwise elongate in shape having a width (oriented along the vehicle 50 longitudinal axis of travel)

greater than its height. It will be appreciated that the length of the springs spans from wheel to wheel.

The spring arms 60 and 62 can include a single leaf spring as depicted in the illustrated embodiments of FIGS. 2 and 3. In some embodiments the spring arms 60 and 62 are made from a composite material such as, but not limited to, a high glass epoxy composite. As will be appreciated, the spring can also be made of steel and other materials.

It will be appreciated that the orientation of the spring arms 60 and 62 relative to one another, the size and shape of the arms, coupled with the material type, all can be tailored to provide the required stiffness in the suspension and associated control arm function.

The spring end brackets 64 are used to secure the combined spring and control arm 58 to the wheels 54. The spring end brackets 64 can be secured to the wheels 54 using a ball and socket assembly 68 where the bracket 64 can be configured to include either the bearing stud or socket of a ball and socket joint. The bracket can also be attached via hard plastic, metallic, or rubber bushings. In some forms the spring end brackets 64 can be bolted or riveted to the spring arms 60 and 62. The spring end brackets 64 can be an assembly of a top and bottom bracket that are joined together. In other alternative and/or additional forms, the spring end brackets 64 can be unitary piece cast in place or otherwise bonded to the end of the spring arms 60 and 62. The spring end brackets 64 can be aluminum material, but other materials are also contemplated.

In the illustrated embodiment the spring arms 60 and 62 are secured to the chassis 57 through spring arm clamps 70 and 72. Spring arm clamps 70 and 72 can be configured as a clamp that captures and holds the spring arms 60 and 62, respectively, in place. The spring arm clamps 70 and 72 can surround both top and bottom of the spring arms 60 and 62. In some embodiments the spring arm clamps 70 and 72 can be rigidly secured to the chassis 57 such as through a bolted connection, welding, etc. Other types of devices can be used to clamp the spring arm to the chassis 57 to hold the spring arm in place. For example, the spring arm clamps 70 and 72 used to hold the spring arms 60 and 62 can take the form of a bolt, a bolt and washer assembly, etc.

The combined spring and control arm 58 need not be rigidly mounted to the chassis 57. In some embodiments the combined spring and control arm 58 can be mounted in the vehicle 50 in a manner such that the combined spring and control arm 58 also functions as an anti-roll bar. The embodiment of FIG. 2 that illustrates bushings 66, combined with the embodiment of FIG. 3 which shows the spring arm clamps 70 and 72 holding the spring arms 60 and 62 in place, depict one embodiment of the spring that is not rigidly mounted by virtue of the bushings 66 being captured by the clamps 70 and 72 to secure the spring arms 60 and 62 in place. The bushings 66 in this embodiment provide a resilient double mount for each spring arm 60 and 62. The resilient double mounts of this embodiment provide an anti-roll bar capability that can be beneficial for handling and/or ride performance. The anti-roll bar effect of the double mounts permit the spring arms 60 and 62 to provide sympathetic motion such that opposite ends of the spring arms move upward or downward together when the other side is displaced during motion of the vehicle 50. Hard mounting the spring arms 60 and 62 to the chassis 57 may effectively separate the left and right sides of the spring from one another and therefore effectively provide a different type of response that does not result in a sympathetic anti-roll bar effect motion. As illustrated in FIG. 3, the suspension 56 does not include a traditional anti-roll bar but the manner of double mounted resilient attachment of the spring arms 60 and 62 to the chassis 57 provide the same or similar effect.

The bushings 66 can be made of a resilient material such as rubber, but other elastomeric or other materials having suitable resiliency are also contemplated herein. The bushings 66 can be two halves that are joined together through bonding or other suitable process to sandwich the spring arms 60 and 62. In some forms the bushings 66 fully encase the spring arms 60 and 62.

Turning now specifically to FIG. 3, the combined spring and control arm 58 is illustrated installed between a wheel hub 74 and wheel 54. The spring end brackets 64 are connected to a steering knuckle 76 through a ball and socket joint 68. The steering knuckle 76 can include a finger 78 used to abut the spring end bracket 64 to prevent overturning of the wheel 54 and/or contact between the wheel 54 and vehicle structure. A wheel hub carrier 80 is structured to be connected to a shock absorber 82 that provides a damping for the suspension 56. The wheel hub carrier 80 is connected to a rack and pinion drive linkage of a steering control.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a golf cart including a combined spring and control arm device structured for use in a vehicle suspension with a pair of opposing wheels which are supported by the combined spring and control arm device, the combined spring and control arm device configured as a sole control arm device in the golf cart which is associated with the pair of opposing wheels, the combined spring and control arm device having spring arms that are elongate in orientation from a first end to a second end and that are laterally spaced relative to one another, the spring arms extending to a spring end bracket structured to provide a mounting mechanism of the combined spring and control arm device to a vehicle, a lateral spacing between the spring arms shaped such that the spacing increases between the first end and an intermediate position between the first end and second end, and the spacing decreases from the intermediate position to the second end.

2. The apparatus of claim 1, which further includes a plurality of resilient bushings connected to the spring arms, the resilient bushings located intermediate the first end and second end.

3. The apparatus of claim 2, which further includes a spring arm clamp connected to at least one of the plurality of resilient bushings.

4. The apparatus of claim 1, wherein the lateral spacing between the spring arms is constant over a defined length of the spring arms at a location intermediate the first end and second end, and wherein the spring end bracket includes one of a bearing stud and a socket of a ball and socket joint.

5. The apparatus of claim 4, wherein two bushings are located over the defined length of each of the spring arms where the lateral spacing is constant such that a spacing and resilient mounting of the spring arms to a chassis provide an anti-roll bar effect.

6. The apparatus of claim 1, wherein the spring end bracket is one of a structure secured to the spring arms through a mechanical connection, a structure secured to the spring arms through bonding, a cast metallic structure secured to the spring arms through a mechanical connection, an in-situ cast metallic structure bonded to the spring arms through a casting process.

7. The apparatus of claim 1, wherein the spring arms are connected to a chassis of the golf cart through a plurality of resilient bushings, the spring end bracket is connected to a steering knuckle installed in the golf cart, and wherein the spring arms serve the purposes of a traditional control arm to locate and control wheel position and traditional spring to provide ride quality.

8. An apparatus comprising:
a unitary spring and control arm vehicle suspension device having a pair of laterally offset leaf springs each having a height and width in cross section and a length that extends from a first end to a second end of the unitary spring and control arm vehicle suspension device, the pair of leaf springs having a shape along their respective lengths that are oriented to converge toward one another at the respective first and second ends such that the offset between the leaf springs is increasingly small as the length converge toward the respective ends;
a spring arm clamp attached to one of the pair of laterally offset leaf springs to connect the one of the pair of laterally offset leaf springs to a vehicle chassis of a golf cart; and
another spring arm clamp attached to the other one of the pair of laterally offset leaf springs;
wherein each of the pair of laterally offset leaf springs are separate individual leaf springs that are individually fastened to the spring arm clamp; and
wherein the unitary spring and control arm vehicle suspension device serves a control arm function for a pair of wheels of the golf cart that are coupled to the unitary device such that the unitary spring and control arm vehicle suspension device is a sole control arm device for the pair of wheels.

9. The apparatus of claim 8, which further includes a spring end bracket configured to transfer loads between the unitary spring and control arm vehicle suspension device and a vehicle, and wherein the width of each of the leaf springs is greater than its height and the lateral offset is in the width direction.

10. The apparatus of claim 9, wherein the spring end bracket is affixed to a steering knuckle of a motorized vehicle through a ball and socket joint, and wherein the spring arm clamp surrounds the top and bottom of the one of the pair of laterally offset leaf springs.

11. The apparatus of claim 8, which further includes the vehicle chassis to which the spring arm clamp is affixed, and wherein a bushing is located on top and bottom of the one of the pair of leaf springs between the one of the pair of leaf springs and the spring arm clamp.

12. The apparatus of claim 11, wherein each of the pair of laterally offset leaf springs are connected to the vehicle chassis through a plurality of bushings, a configuration of the plurality of bushings providing an anti-roll bar effect.

13. The apparatus of claim 8, wherein the springs are made of a composite material, and wherein a plurality of resilient bushings are coupled to each of the springs.

14. The apparatus of claim 13, wherein the resilient bushings are an elastomeric material, wherein the apparatus further includes the golf cart to which the pair of leaf springs are attached via the plurality of resilient bushings, and which further includes a shock absorber attached to the golf cart.

15. An apparatus comprising:
a golf cart having a suspension with a damper, the suspension including a single device having a combined means for providing suspension spring rate and means for providing control arm location keeping, the single device used to provide suspension for a pair of wheels and provide a sole control arm structure for the pair of wheels to which the single device is attached.

16. The apparatus of claim 15, which further includes means for providing anti-roll bar effect to the suspension.

17. A method comprising:
connecting a combined leaf spring control arm device to a steering knuckle of a golf cart such that a completed golf cart includes the combined leaf spring control arm as a sole control arm device on a pair of wheels to which the combined leaf spring control arm is affixed, the combined leaf spring control arm device having a plurality of leaf springs bowed in opposite directions from one another in which an open area is located between the plurality of bowed leaf springs;
coupling a plurality of resilient bushings to the plurality of bowed leaf springs; and
capturing the plurality of resilient bushings to a vehicle chassis through a spring arm clamp.

18. The method of claim 17, wherein the connecting includes fastening the combined leaf spring control arm device to the steering knuckle through a ball and socket joint.

19. The method of claim 17, which further includes installing a shock absorber in the golf cart such that the shock absorber and combined leaf spring control arm device form a suspension for the golf cart.

* * * * *